United States Patent
Koch et al.

(10) Patent No.: US 6,296,089 B1
(45) Date of Patent: Oct. 2, 2001

(54) LOCKING DEVICE FOR LOCKING OBJECTS THAT MOVE IN RELATION TO EACH OTHER

(75) Inventors: Klaus Koch, Dahlheim; Rainer Sauer, Anschau; Oliver Schüttler, Monreal, all of (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/398,981

(22) Filed: Sep. 17, 1999

(30) Foreign Application Priority Data

Sep. 17, 1998 (DE) .............................. 198 42 563
Aug. 14, 1999 (DE) .............................. 199 38 699

(51) Int. Cl.⁷ ........................................ F16F 9/32
(52) U.S. Cl. ...................... 188/300; 267/64.12
(58) Field of Search .................... 188/300, 314, 188/313, 316, 317, 322.22, 281, 322.15; 267/64.12, 120

(56) References Cited

U.S. PATENT DOCUMENTS 3,414,134 * 12/1968 Nealis .................................. 213/43
5,450,933   9/1995 Schüttler .
5,560,456 * 10/1996 Koch et al. ........................ 188/300
5,799,759   9/1998 Koch .

FOREIGN PATENT DOCUMENTS 3413815  10/1985 (DE) .
4239172  12/1993 (DE) .
1161859   8/1969 (GB) .

* cited by examiner

*Primary Examiner*—Robert J. Oberleitner
*Assistant Examiner*—Pamela J. Lipka
(74) *Attorney, Agent, or Firm*—Baker Botts L.L.P.

(57) ABSTRACT

A locking device includes a cylinder chamber that is filled with a working medium and is divided by a piston into two working sections. A flow connection between the working sections is controlled by a check valve and a gate valve, which are arranged in parallel. When the check valve opens, dynamic pressure of the working fluid flowing through the check valve from one working section acts on a fluid contact surface of the gate valve and opens the gate valve. After it opens, the gate valve is kept in the open position by a pressure in a bypass past the check valve so that working fluid can thereafter flow through the fluid connection, regardless of the state of the check valve.

10 Claims, 4 Drawing Sheets

LOCKING DEVICE FOR LOCKING OBJECTS THAT MOVE IN RELATION TO EACH OTHER

BACKGROUND OF THE INVENTION

The present invention relates to a locking device of the type in which a cylinder defining a chamber that is filled with a working fluid receives a piston on a piston rod that divides the chamber into two working sections and a flow connection between the working sections is controlled by a first valve and a second valve arranged in series.

U.S. Pat. No. 5,450,933 describes and shows a locking piston/cylinder device, for example, for use with doors, in which a flow connection through the piston has two throttle points in series to allow fluid flow between two working sections, one on each side of the piston. The flow at each throttle point is controlled by a valve that has a valve body arranged in step fashion that is biased in the closing direction by a spring. A small pin on both valve bodies seals a flow connection between the two throttle points or working sections. An annular shoulder on the valve bodies provides a pressure-affected surface for the one flow direction, and the projected end face of the pin provides a pressure-affected surface for the other flow direction. The opening motion of both valves and therefore the securing force of the locking device is determined by the springs of the two valve bodies, since both valves must be open when the working medium flows. Very strict relationships are, therefore, imposed on the design of the securing forces in relation to the opening forces, which can lead to the opening forces being too great or too small. The object of the two valves connected in series lies, among other things, in that a slightly greater force is required for opening the valve and a smaller force is required for keeping the valve open, wherein one valve would be completely sufficient for one through-flow direction. If the intent is to realize this operational behavior for both flow directions, then two valves must be used. For reasons of installation space economy, the two valves are arranged in a flow connection and must, therefore, inevitably be open at the same time.

BRIEF SUMMARY OF THE INVENTION

The object of the present invention is to eliminate the above-described relationship between the opening and locking forces.

According to the invention, the foregoing object is attained by a locking device that includes a cylinder defining a chamber that is filled with a working fluid, a piston dividing the chamber into two working sections, and a flow connection between the working sections which is controlled by a first valve and a second valve arranged in parallel. The second valve is arranged to open only when the first valve opens in response to dynamic pressure of working fluid passing through the first valve from one working section. The second valve, once open, is kept open by a pressure in a bypass from the said one working section past the first valve, regardless of the state of the first valve.

The essential advantage of the present invention is that with an already open second valve, the state or the throttle action of the first valve does not exert any influence on the operational behavior of the second valve. Consequently, the two valves can be designed exactly for the respective technical tasks.

In an advantageous embodiment, the second valve is a gate valve that opens or closes the bypass to the first valve. If a gate valve has its flow direction radial to the direction of movement of the piston, then even small adjusting forces on the locking device move the gate valve between its open and closed positions.

With regard to the simplest and shortest flow paths, the working medium that has flowed from the first valve and the working medium flowing from the bypass are combined in an accumulation chamber.

A locking device, according to the present invention, may have a valve tappet associated with one of the two valves that is functionally connected to an opening device, the opening device being controlled independently of the pressure conditions of the working medium acting on the two valves. As a result, the locking device can be brought into the unlocked condition at a predetermined point along the operating stroke.

The opening device may include a securing device which secures the valve tappet during a sliding motion of the piston and, therefore, opens the one of the two valves independently of the state of the other valve.

The function of keeping one of the two valves open is limited to one stroke length by virtue of the fact that the securing device includes a spring element which keeps the valve tappet open for one stroke length counter to the force of the spring of the associated valve. Then, the opening device disengages and is thereafter inactive. At a new stop of the locking device motion, the opening device is inoperative.

Consequently, the securing device is designed for a defined stroke position of the piston, which corresponds to the fully retracted position of the piston. In vehicle doors, which must be opened from the closed position, there is frequently an unfavorable lever arm length when the door is closed so that relatively high manual forces would be required for an opening motion of one of the two valves. This particular embodiment counteracts the above-described effect and enables the door to be opened with a low force.

The spring element, together with the valve tappet, can be allowed to cooperate with a cylinder-end stop, wherein the stop determines the defined stroke position. A simple bead in the cylinder can be used as the stop.

DESCRIPTION OF THE DRAWINGS

For a more complete understanding of the present invention, and the advantages thereof, reference may be made to the following written description of exemplary embodiments, taken in conjunction with the accompanying drawings.

DESCRIPTION OF THE EMBODIMENTS

Figure 1:
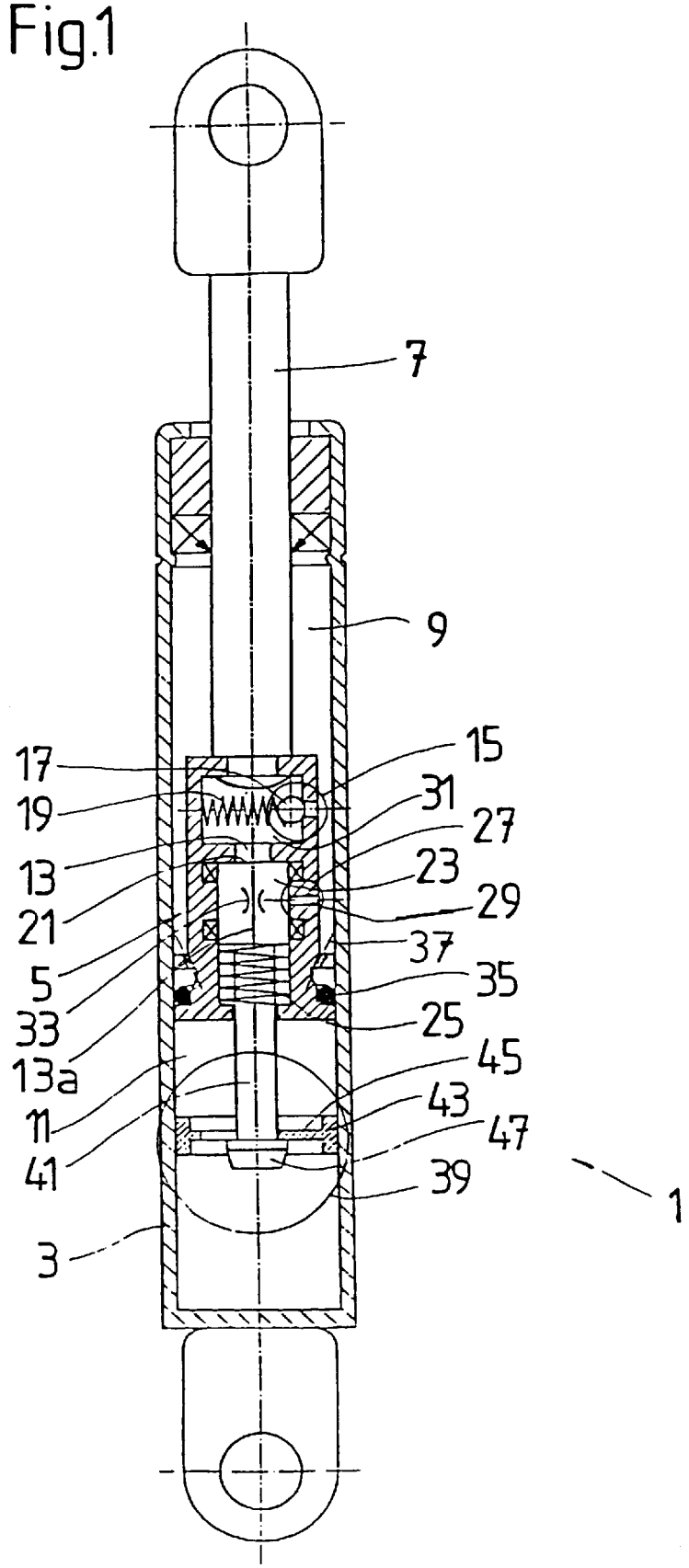
FIG. 1 is a generally schematic axial cross-sectional view of a locking device according to the invention, showing the device in the locked state.
Figure 2:
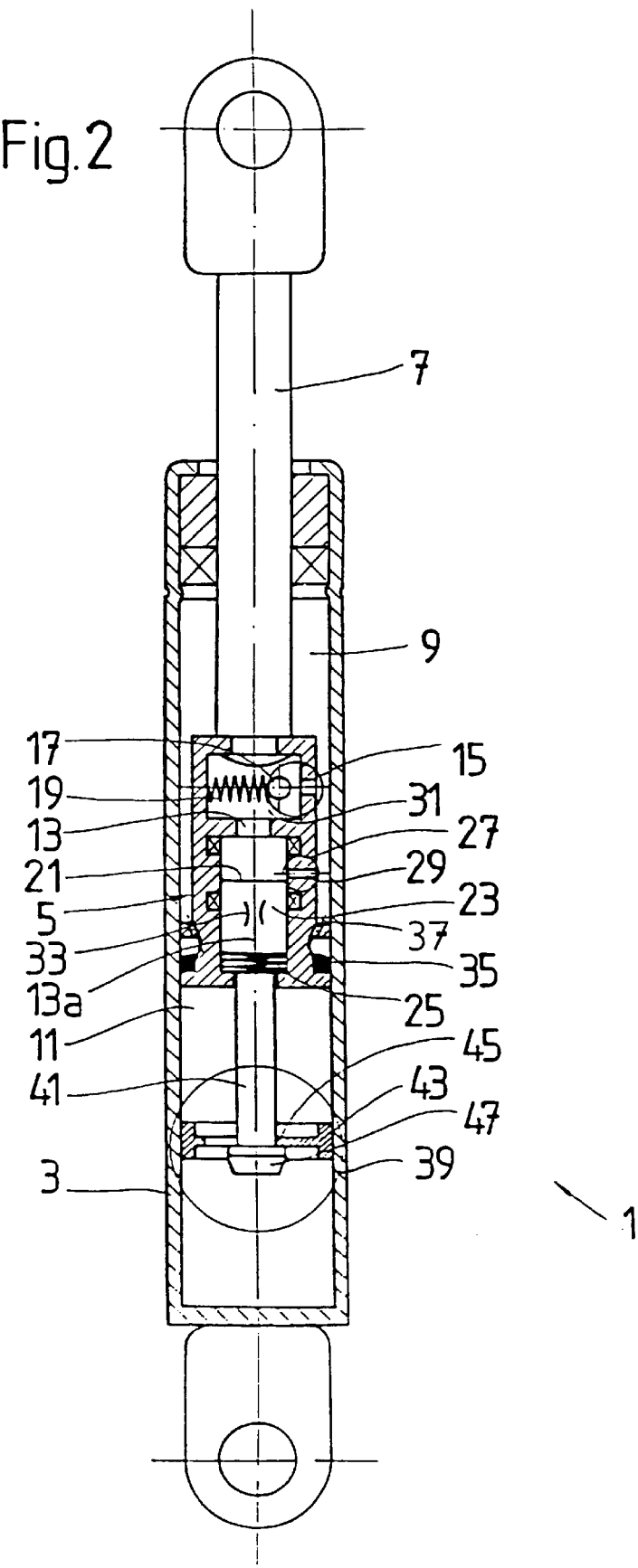
FIG. 2 shows the locking device of FIG. 1 in the unlocked state.

The locking device 1 shown in FIGS. 1 and 2 has a cylinder 3, in which a piston 5 affixed to a piston rod 7 divides the cylinder chamber into an upper working section 9 and lower working section 11. The cylinder chamber is filled with a working medium, which may be a gas or a liquid. In the case of a liquid, a compensation chamber containing a gas under pressure must be provided to compensate for the change in the volume of the cylinder chamber due to the retracting and extending of the piston rod.

Between the two working sections, there is a flow connection 13, which can be opened by a first valve 15 having a valve body 17 against the closing force of a first spring 19 by an operating pressure in the upper working section 9. The first valve 15 is, in particular, a check valve. A control surface 21 of a second valve body 23 is disposed in the flow connection downstream of the first valve 15 with respect to the upper working section 9. The second valve body 23, together with a second spring 25 that acts on it, constitutes a second valve 27. The second valve 27 is a gate valve, which opens or closes a bypass 29 from the upper working section 9 to a portion of the flow connection 13 downstream from the first valve 15, which portion is referred to hereinafter as an accumulation chamber 31. When the valve 27 opens the bypass, the working fluid flows from the accumulation chamber 31 into the lower working section 11 through of a section 13a of the flow connection 13. Along the section 13a of the flow connection 13, a throttle point 33 is provided, which produces a considerable pressure difference between the accumulation chamber 31 and the outlet of the section 13a to the lower working section 11.

In operation upon an extending motion of the piston rod 7 in which the piston rod is moving out of the cylinder (see FIG. 2), the first valve 15 opens due to the dynamic pressure in the upper working section 9 upstream of the first valve body 17 and allows working fluid to flow from the upper working section 9 into the accumulation chamber 31. The throttle point 33 in the passage portion 13a permits a dynamic pressure to build up in the accumulation chamber 31, which acts on the control surface 21 of the second valve 27 and moves the second valve body 23 into the open position shown in FIG. 2, in which the bypass 29 communicates the upper working section 9 to the accumulation chamber 31. Depending on the throttle resistances between the first valve 15 and the second valve 27, the first valve can close without influencing the operational behavior of the second valve 27 and, therefore, of the entire locking device.

In the retracting direction, i.e., when the rod is moving into the cylinder, both valves 15 and 27 are closed by their respective springs 19 and 25. To enable the piston rod of the locking device to be retracted, the piston 5 has a switching ring 35, which opens an overpressure connection 37 between the two working sections 9 and 11. Above a defined retraction force, the switching ring 35 is moved by friction with the cylinder wall into a recessed switching ring groove 35a, which permits a flow to occur behind the otherwise sealed switching ring. The second valve body can thereby travel with its control surface 21 against the stop without influencing the retracting motion since the switch valve ring 35 has opened the over-pressure connection 37 and, therefore, the first and second valves have been bypassed.

The locking device 1 also has an opening device 39, i.e., a device that unlocks it, which includes a valve tappet 41 of the second valve 27 and a securing device 43 that is fastened to the cylinder 3. The securing device has at least one spring element 45 in the form of a resilient tab that engages a shoulder 47 on the tappet 41. The purpose of the opening device is to open the second valve 27 independently of the dynamic pressures acting on the valves 15 and 27, in order to achieve a low-force unlocking of the locking device since the larger force required to produce a dynamic pressure for opening the first valve 15 is not required.

With an extending motion of the piston rod and the piston, the valve tappet 41 is initially held stationary by the spring element 45. Upon relative motion between the valve tappet and the piston, the second valve 27 opens. When the second valve 27 is opened, the spring 25 is compressed, which increases the spring force of the spring 25 of the second valve so that it exceeds the securing force of the spring element 45, which is then deflected against the shoulder 47 and is disengaged.

Upon retraction of the locking device 1, the shoulder 47 on the tappet 41 penetrates the securing element 43 by the camming action of its conical end surface working against the spring element 45.

The opening device 39 is preferably associated with the fully retracted state of the locking device 1 so that with the use of the locking device with a large door, the door can be opened from the closed position with a low force.

Figure 3:
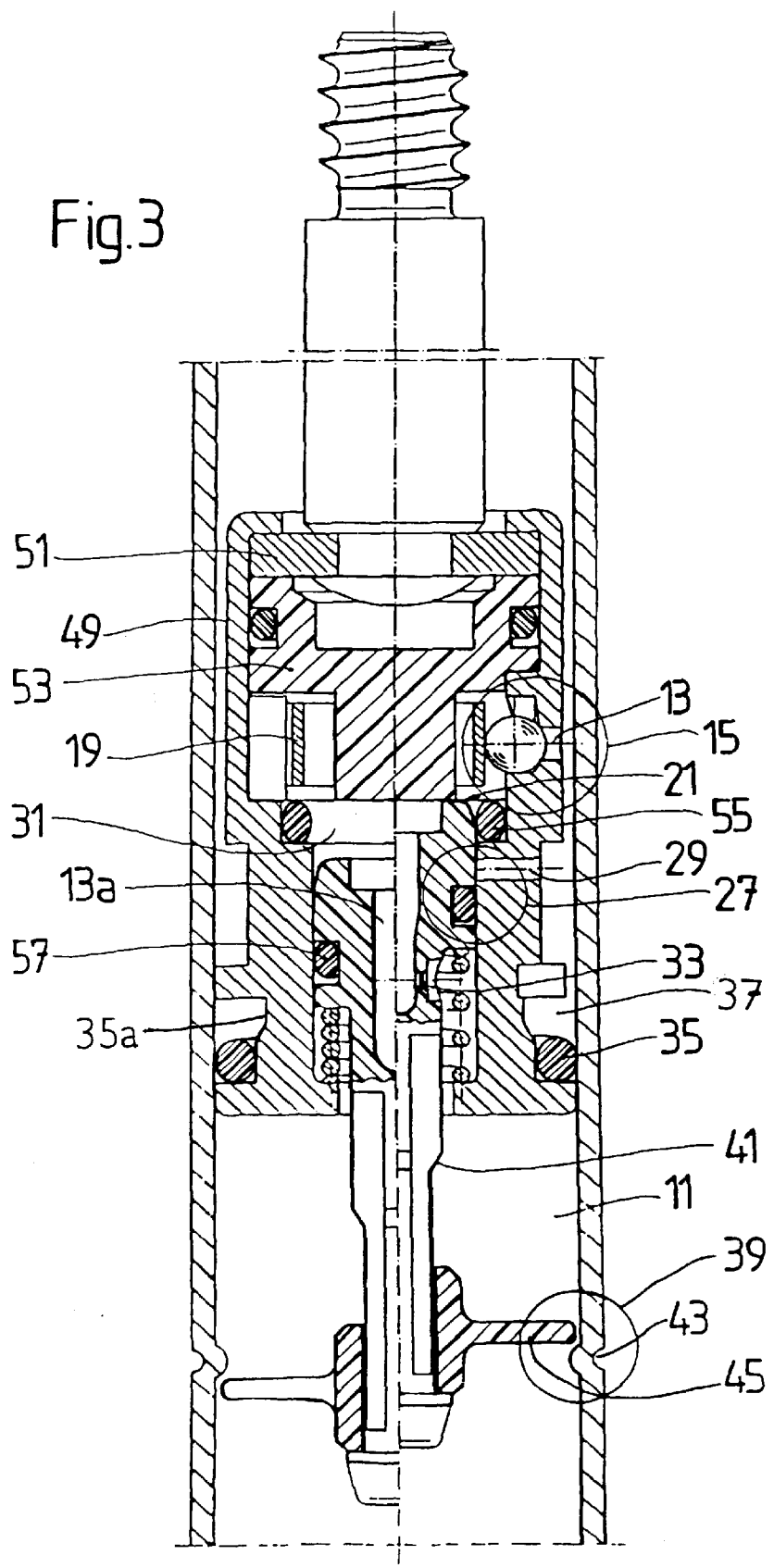
FIG. 3 is an axial cross-sectional view of a first embodiment of a locking device based on the principles of the locking device of FIGS. 1 and 2.

FIG. 3 shows a first embodiment of an apparatus based on the principles described above and illustrated schematically in FIGS. 1 and 2. An annular spring is used as the spring 19 for the first valve 15 and can be a bi-metal spring so that 1st the temperature influence on the opening force on the valve 15 can be compensated for.

A housing 49 of the piston 5 is of a multi-stepped configuration in the direction of the second valve 27 in order to be able to assemble the piston 5 through the upper end of the housing 49. The upper portion is initially cylindrical. After assembly, a fastening disk 51 affixed to the end of the piston rod is inserted in the upper end of the housing 49, and the upper end of the housing 49 is crimped over to provide a retaining flange that engages the fastening disk 51. An internal housing part 53 that is sealed to the housing and the upper part of the housing 49 together define the flow connection 13 between the upper working section 9 and the accumulation chamber 31. In the right half portion of FIG. 3, the second valve 27 is shown in the closed position. Although the control surface 21 engages the internal housing part 53 due to the spring force of the spring 25, the engagement is not fluid tight and permits fluid flow to the accumulation chamber 31 when the valve 15,17 opens.

A first gate valve seal 55 is disposed in the accumulation chamber 31, which prevents the flow of working medium from the bypass 29 into the accumulation chamber 31 when the second valve 27 is in the closed position. In the open position, the gate valve seal 55 is inactive, as can be seen in the left half of FIG. 3. A second gate valve seal 57 seals the bypass 29 from the lower working section 11. A bore in the upper portion of the valve tappet 41 constitutes the flow connection section 13a and has a throttle point 33 in the form of a lateral bore, which restricts flow from the flow connection section 13a into the lower working section 11 and allows pressure to build up in the accumulation chamber 31 so that valve 27 opens.

The opening device 39, which unlocks the locking device 1 by opening the valve 27, includes a spring element 45 that is attached to the valve tappet 41. The securing device 43 is a simple, continuous bead in the cylinder 3. The opening device 39 is the same in operating principle as that of FIGS. 1 and 2.

Figure 4:
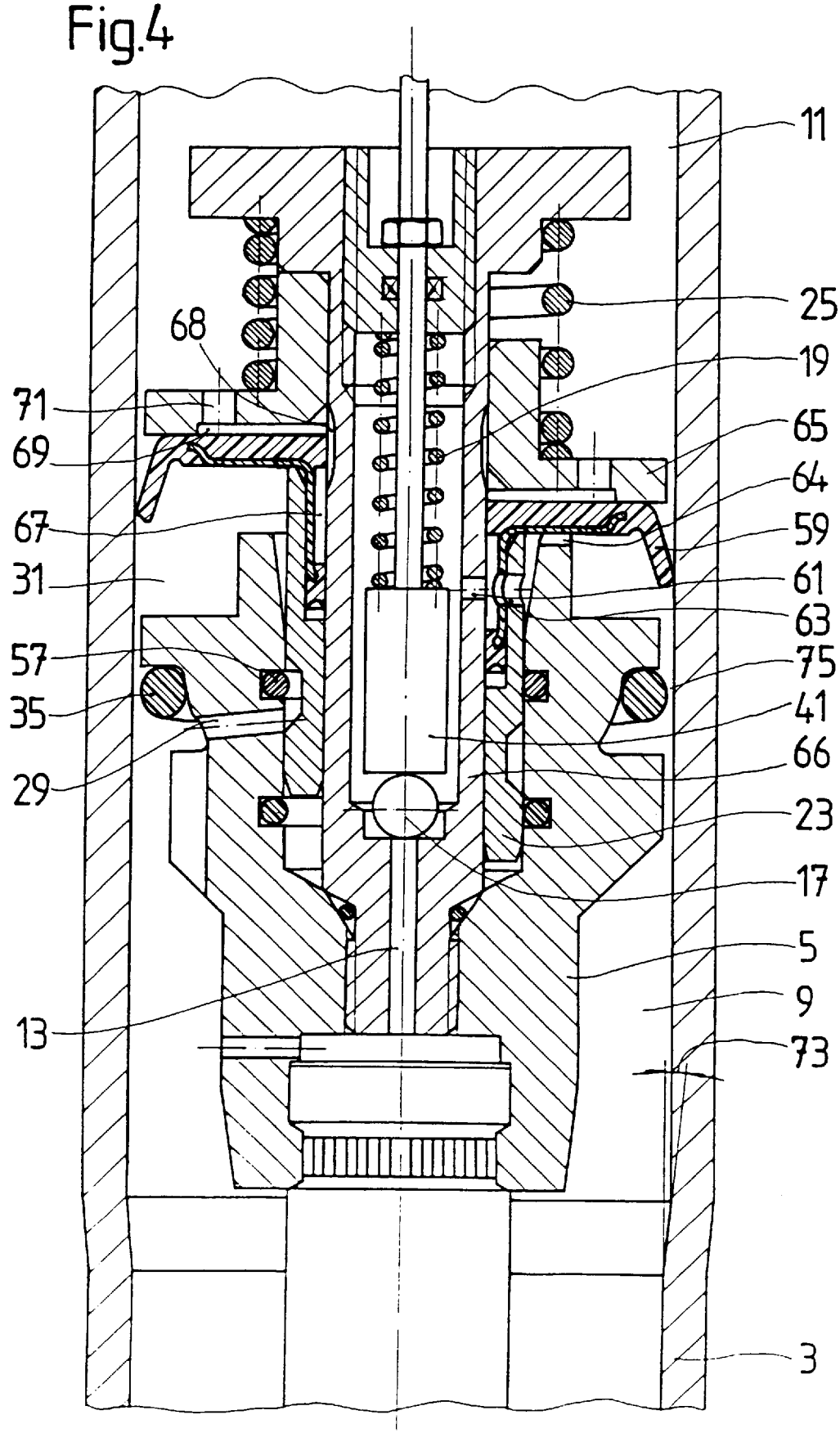
FIG. 4 is an axial cross-sectional view of a second embodiment of a locking device based on the principles of the locking device of FIGS. 1 and 2.

FIG. 4 shows another embodiment of a locking device in which the first valve 15 is disposed in the axial direction of the piston rod 7. (Note that FIG. 4 is inverted with respect to FIG. 3—the piston rod extends downwardly from the piston on the drawing sheet.) The functional principles correspond to those of the embodiments according to FIGS. 1 to 3. Components which are the same have corresponding reference numerals.

The control surface 21 for the actuation of the second valve body 23 is constituted by a sealing collar 59, which forms a seal at its outer perimeter with the inner wall of the cylinder 3 and on its inner diameter with the second valve body 23.

In the right half of the drawing, the flow connection between the two working sections 9 and 11 is completely blocked. The working medium flowing radially into the piston 5 through the fluid connection 13 is in contact with the first valve body, which is a ball. The pressure-affected surface of the ball is very small, corresponding to the cross section of the flow connection 13. Very small spring forces of the first spring 19 can already prestress the first valve body 17 in a sealing fashion. When the piston rod moves in the direction of the working section 9 as the piston rod extends from the cylinder, the valve body 17 is lifted up from its valve seat. The valve body 17 is guided by the valve tappet 41, which extends into the work chamber 11 and is biased by the spring 19. The working medium flows along the valve tappet to a lateral opening 61, which constantly coincides with another lateral opening 63 in the second valve body 23, and thence flows through at least one groove 64 into the accumulation chamber 31. In the closed state of the second valve, the accumulation chamber 31 is sealed in relation to the work chamber 11 by the sealing collar 59 (see the right half of FIG. 4.

As soon as a sufficient dynamic pressure is acting against the sealing collar in the accumulation chamber 31, the gate 65, which is continuously connected to the sealing collar and second valve body 23 and is biased by the spring 25 of the second valve, is moved into the position according to the left half of FIG. 4. Now the working medium can flow from the working section 9 by way of the bypass 29 along the seal 57 into the accumulation chamber 31. The flow of the working medium continues by way of the lateral opening 63 into an annular chamber 67 formed by the sealing collar 59 and a guide pin 66. The annular chamber 67 is in turn connected to an outflow groove 68 of the guide pin 66. The outflow groove is connected to another annular chamber 69, which is formed on the back side of the sealing collar, the front side and a shoulder of the gate 65, as well as the guide pin. The outflow groove is adjoined by axial openings 71 in the gate 65, which lead into the working section 11.

With regard to a simple adjustment from a defined stroke position, two variants can be used. On the one hand, the cylinder 3 can have a diameter increase 73 at a certain length, which can render the switching ring 35 inactive since in the vicinity of the switching ring, there is also a sufficiently large gap 75 through which the working medium can flow. As a result, the first valve 15 is bypassed since the working medium flows from the work chamber 9 directly into the accumulation chamber 31 and then travels the path already described above. The sealing collar 59 is radially elastic and can therefore compensate for the diametrical difference in the vicinity of the diameter increase.

If the intent is to eliminate a radially elastic sealing collar and a diameter increase, the valve tappet 41, which protrudes into the working section 11 as mentioned above, can be provided with an opening device in accordance with the principle of FIGS. 1 to 3. The advantage of connecting the opening device to the valve tappet on the first valve 15 lies in that the spring force of the spring 17 can be a great deal smaller than the spring force of the spring 25 since the pressure-affected surfaces which counteract the spring forces of both springs are embodied with very different sizes. With a slow movement starting from a standstill, only a slight force is required as a triggering force for the first valve

What is claimed is:
1. A locking device comprising
a cylinder defining a chamber that is filled with a working fluid,
a piston dividing the chamber into two working sections,
a flow connection between the working sections which is controlled by a first valve and a second valve arranged in parallel, the second valve being arranged to open only when the first valve opens in response to dynamic pressure of working fluid passing through the first valve, and the second valve once open being kept open by a pressure in a bypass past the first valve regardless of the state of the first valve.
2. The locking device according to claim 1, wherein the second valve is a gate valve that opens or closes the bypass.
3. The locking device according to claim 1, wherein the working medium that flows through the first valve and the working medium that flows through the bypass are combined in an accumulation chamber.
4. The locking device according to claim 1, wherein a valve tappet of one of the two valves is functionally associated with an opening device, the opening device being controlled independently of the pressure conditions of the working medium at the two valves.
5. The locking device according to claim 4, wherein the opening device includes a securing device which retains the valve tappet stationary during a relative motion of the piston and therefore opens the one of the two valves independently of the state of the other valve.
6. The locking device according to claim 5, wherein the securing device includes a spring element, which holds the valve tappet against the force of a spring of the associated one of the two valves for one stroke length of the associated valve.
7. The locking device according to claim 5, wherein the spring element cooperates with a cylinder-end stop and the location of the stop determines the defined stroke position.
8. The locking device according to claim 4, wherein the securing device is arranged at a defined position along the stroke of the piston in the cylinder.
9. The locking device according to claim 8, wherein the defined stroke position corresponds to the fully retracted position of the piston in the cylinder.
10. A locking device comprising
a cylinder defining a chamber that is filled with a working fluid,
a piston affixed to a piston rod and dividing the chamber into a first working section and-a second working section,
a flow connection between the working sections which includes an accumulation chamber and an outflow section,
a throttling point in the outflow section,
a bypass communicating the first working section with the accumulation chamber,
a check valve interposed between the first working section and the accumulation chamber, and
and gate valve arranged to open and close the bypass, biased by a spring to close the bypass, and having a contact surface facing the accumulation chamber and acted on by a dynamic pressure of the working fluid when the check valve is open such that the gate valve opens against the bias of the spring when the check valve opens due to a pressure build up caused by the throttling point, whereby once the gate valve opens the bypass to permit working fluid to flow from the first working section through the outflow section and the throttling point to the second working section, the gate valve remains open regardless of the state of the check valve.

* * * * *

UNITED STATES PATENT AND TRADEMARK OFFICE
CERTIFICATE OF CORRECTION

PATENT NO. : 6,296,089 B1
DATED : October 2, 2001
INVENTOR(S) : Koch et al.

It is certified that error appears in the above-identified patent and that said Letters Patent is hereby corrected as shown below:

Column 6,
Line 43, "and-a" should read -- and a --
Line 53, "and" (first occurrence) should read -- a --

Column 4,
Line 20, "1st" should be deleted

Signed and Sealed this

First Day of April, 2003

JAMES E. ROGAN
*Director of the United States Patent and Trademark Office*